(12) United States Patent
Sheridan

(10) Patent No.: US 10,443,708 B2
(45) Date of Patent: Oct. 15, 2019

(54) JOURNAL BEARING FOR ROTATING GEAR CARRIER

(71) Applicant: United Technologies Corporation, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 294 days.

(21) Appl. No.: 15/132,620

(22) Filed: Apr. 19, 2016

(65) Prior Publication Data

US 2016/0377166 A1   Dec. 29, 2016

Related U.S. Application Data

(60) Provisional application No. 62/183,395, filed on Jun. 23, 2015.

(51) Int. Cl.
  *F16H 57/04* (2010.01)
  *F16H 1/28* (2006.01)
  (Continued)

(52) U.S. Cl.
  CPC ....... *F16H 57/0479* (2013.01); *F01D 25/162* (2013.01); *F01D 25/166* (2013.01); *F02C 3/107* (2013.01); *F02C 7/36* (2013.01); *F16H 1/28* (2013.01); *F16H 57/043* (2013.01); *F16H 57/0471* (2013.01); *F16H 57/0486* (2013.01); *F16H 57/082* (2013.01); *F05D 2240/53* (2013.01); *F05D 2240/54* (2013.01);
  (Continued)

(58) Field of Classification Search
  CPC ...... F01D 25/162; F01D 25/166; F02C 3/107; F02C 7/36; F05D 2240/53; F05D 2240/54; F05D 2250/241; F05D 2260/40311; F05D 2260/98; F16H 1/28; F16H 2057/085; F16H 57/043; F16H 57/0471; F16H 57/047

See application file for complete search history.

(56) References Cited

U.S. PATENT DOCUMENTS 3,635,103 A * 1/1972 Monti ..................... F16C 23/10
                                                          384/255
4,251,987 A   2/1981 Adamson
(Continued)

FOREIGN PATENT DOCUMENTS

EP    1998009      12/2008
EP    2360391 A1   8/2011
(Continued)

OTHER PUBLICATIONS

European Search Report for EP Application No. 16175770.3 dated Oct. 24, 2016.

*Primary Examiner* — Jesse S Bogue
(74) *Attorney, Agent, or Firm* — Carlson, Gaskey & Olds, P.C.

(57) ABSTRACT

A gear system for a geared turbofan engine includes a sun gear, a planet gear supported in a carrier and engaged to the sun gear, a forward journal bearing and an aft journal bearing both supporting the planet gear. The carrier includes a forward wall supporting the forward journal bearing and an aft wall supporting the aft journal bearing. A ring gear is engaged to the planet gear. A geared turbofan engine is also disclosed.

18 Claims, 5 Drawing Sheets

(51) Int. Cl.
*F16H 57/08* (2006.01)
*F02C 3/107* (2006.01)
*F01D 25/16* (2006.01)
*F02C 7/36* (2006.01)

(52) U.S. Cl.
CPC ............... *F05D 2250/241* (2013.01); *F05D 2260/40311* (2013.01); *F05D 2260/98* (2013.01); *F16H 2057/085* (2013.01); *Y02T 50/671* (2013.01)

(56) References Cited

U.S. PATENT DOCUMENTS

| | | | |
|---|---|---|---|
| 4,719,818 A | 1/1988 | McCreary | |
| 5,102,379 A * | 4/1992 | Pagluica | F16H 1/2836 475/159 |
| 5,391,125 A | 2/1995 | Turra et al. | |
| 5,409,430 A | 4/1995 | Hashimoto et al. | |
| 6,964,155 B2 | 11/2005 | McCune et al. | |
| 8,292,510 B2 | 10/2012 | Glahn et al. | |
| 8,333,678 B2 * | 12/2012 | McCune | F01D 25/162 384/276 |
| 8,398,517 B2 | 3/2013 | McCune et al. | |
| 8,753,244 B2 | 6/2014 | Pabst et al. | |
| 8,758,190 B2 * | 6/2014 | Montestruc | F16H 1/2836 475/346 |
| 8,790,213 B1 | 7/2014 | Isayama et al. | |
| 8,899,916 B2 | 12/2014 | McCune et al. | |
| 8,986,146 B2 | 3/2015 | Gallet | |
| 9,021,778 B2 | 5/2015 | Kupratis | |
| 2005/0026745 A1 * | 2/2005 | Mitrovic | F16H 1/2836 475/348 |
| 2011/0206498 A1 * | 8/2011 | McCooey | F02C 3/107 415/124.1 |
| 2012/0088624 A1 * | 4/2012 | Sheridan | F01D 25/16 475/159 |
| 2014/0378261 A1 | 12/2014 | Kari | |
| 2015/0078689 A1 * | 3/2015 | Sieveking | F16C 33/1085 384/289 |
| 2015/0252889 A1 * | 9/2015 | Feraud | F16H 57/0442 475/159 |
| 2016/0130976 A1 * | 5/2016 | Bucking | F01D 25/162 415/116 |
| 2016/0215785 A1 * | 7/2016 | Begin | F04D 29/056 |
| 2016/0290396 A1 * | 10/2016 | Lemmers, Jr. | F16H 47/04 |

FOREIGN PATENT DOCUMENTS

| | | |
|---|---|---|
| GB | 2199375 A | 7/1988 |
| JP | 2006-170413 A | 6/2006 |
| KR | 20140037616 | 3/2014 |
| WO | 2013/079153 A1 | 6/2013 |
| WO | 2015/058749 A1 | 4/2015 |

* cited by examiner

JOURNAL BEARING FOR ROTATING GEAR CARRIER

CROSS REFERENCE TO RELATED APPLICATION

This application claims priority to U.S. Provisional Application No. 62/183,395 filed Jun. 23, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Gear assemblies include an input gear that drives intermediate gears supported within a carrier. The intermediate gears engage a ring gear that circumscribes the intermediate gears. The intermediate gears are supported by a bearing system that must accommodate torsional loads and misalignments during operation.

SUMMARY

In a featured embodiment, a gear system for a geared turbofan engine includes a sun gear, a planet gear supported in a carrier and engaged to the sun gear, a forward journal bearing and an aft journal bearing both supporting the planet gear. The carrier includes a forward wall supporting the forward journal bearing and an aft wall supporting the aft journal bearing. A ring gear is engaged to the planet gear.

In another embodiment according to the previous embodiment, one of the carrier and the ring gear is fixed.

In another embodiment according to any of the previous embodiments, the carrier is fixed and the ring gear rotates.

In another embodiment according to any of the previous embodiments, the aft journal bearing and the forward journal bearing have outer spherical surfaces.

In another embodiment according to any of the previous embodiments, each of the aft journal bearing and the forward journal bearing include an oil feed opening and an anti-rotation pin engaged to the corresponding one of the forward wall and aft wall of the carrier.

In another embodiment according to any of the previous embodiments, the carrier includes passages in communication with the oil feed opening for providing lubricant to each of the forward journal bearing and the aft journal bearing.

In another embodiment according to any of the previous embodiments, the planet gear includes an internal cavity.

In another embodiment according to any of the previous embodiments, the planet gear includes end sections on either side of a gear section including gear teeth. The end sections include a thickness less than two (2) times a height of gear teeth in the gear section.

In another embodiment according to any of the previous embodiments, the forward journal bearing and the aft journal bearing are made from at least one of a bronze material, a bronze coating, a bronze alloy and a copper-lead alloy.

In another featured embodiment, a geared turbofan engine includes a fan configured to drive air along a bypass flow path. A compressor section is configured to communicate compressed air to a combustor section for generating a high energy gas flow for driving a turbine section where energy is extracted and utilized to drive the compressor section and the fan section. A gear system is driven by the turbine section. The gear system includes a sun gear. A planet gear is supported in a carrier and engaged to the sun gear. A forward journal bearing and an aft journal bearing both support the planet gear. The carrier includes a forward wall supporting the forward journal bearing and an aft wall supporting the aft journal bearing and a ring gear engaged to the planet gear.

In another embodiment according to the previous embodiment, the carrier rotates and drives the fan and the ring gear is fixed.

In another embodiment according to any of the previous embodiments, the carrier is fixed and the ring gear rotates to drive the fan.

In another embodiment according to any of the previous embodiments, the aft journal bearing and the forward journal bearing have outer spherical surfaces.

In another embodiment according to any of the previous embodiments, each of the aft journal bearing and the forward journal bearing include an oil feed opening and an anti-rotation pin engaged to the corresponding one of the forward wall and aft wall of the carrier.

In another embodiment according to any of the previous embodiments, the carrier includes passages in communication with the oil feed opening for providing lubricant to each of the forward journal bearing and the aft journal bearing.

In another embodiment according to any of the previous embodiments, the planet gear includes an internal cavity.

In another embodiment according to any of the previous embodiments, the planet gear includes end sections on either side of a gear section including gear teeth. The end sections include a thickness less than two (2) times a height of gear teeth in the gear section.

In another embodiment according to any of the previous embodiments, the forward journal bearing and the aft journal bearing are made from at least one of a bronze material, a bronze coating, a bronze alloy and a copper-lead alloy.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
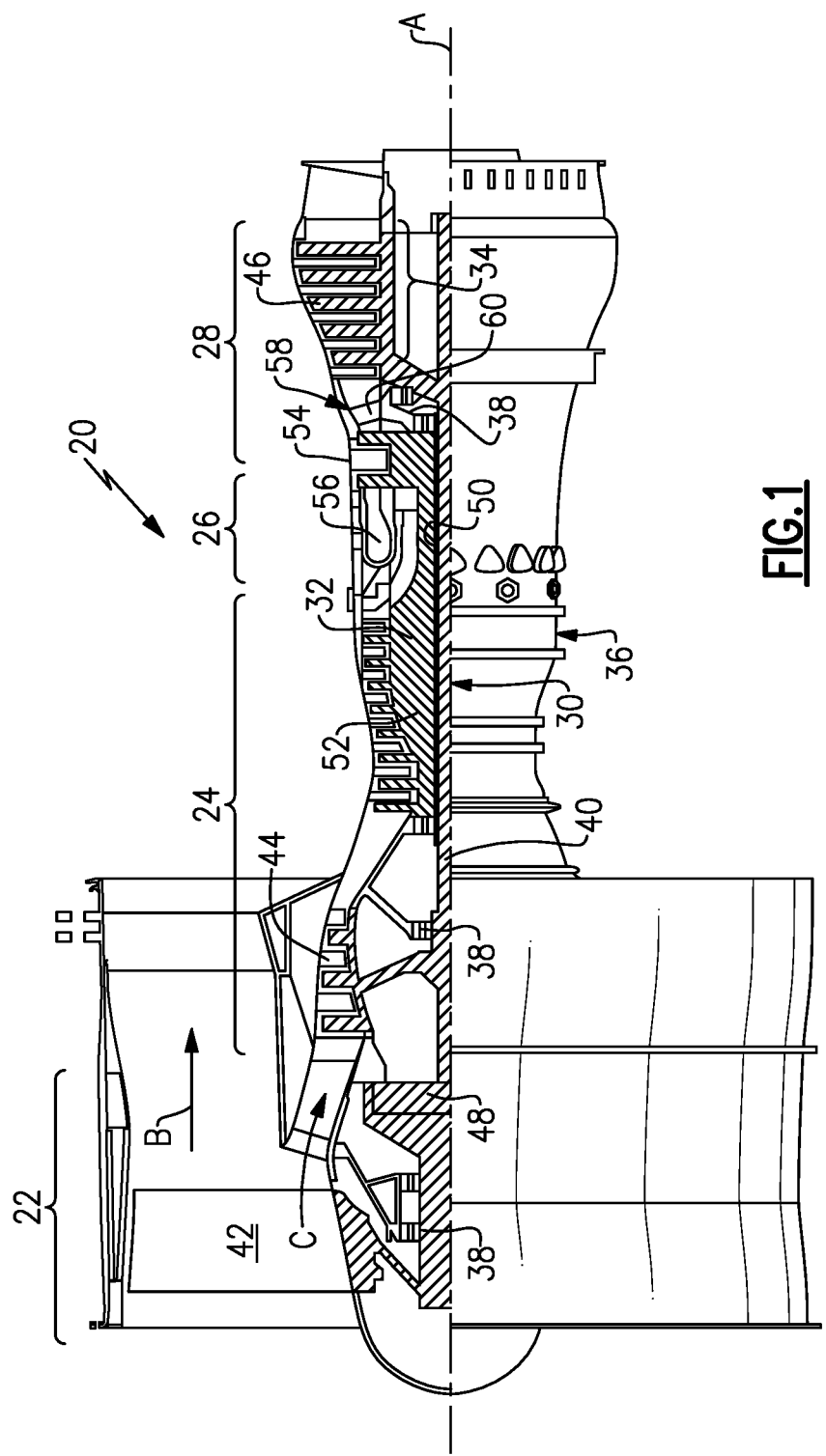
FIG. 1 schematically shows an embodiment of a gas turbine engine.

FIG. 1 schematically illustrates an example gas turbine engine 20 that includes a fan section 22 and a core engine section 25. The core engine section 25 includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vane rows or states in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

Fan pressure ratio is the pressure ratio across the fan blade alone, without a Fan Exit Guide Vane ("FEGV") system. The fan pressure ratio as disclosed herein according to one non-limiting embodiment is less than about 1.50. In another non-limiting embodiment the low fan pressure ratio is less than about 1.45.

Corrected fan tip speed is the actual fan tip speed in ft/sec divided by an industry standard temperature correction of $[(Tram\ °R)/(518.7°\ R)]^{0.5}$. The corrected fan tip speed", as disclosed herein according to one non-limiting embodiment, is less than about 1150 ft/second. The fan pressure ratio and the corrected fan tip speed are applicable to all engine operating conditions including the bucket cruise thrust specific consumption engine operating condition.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
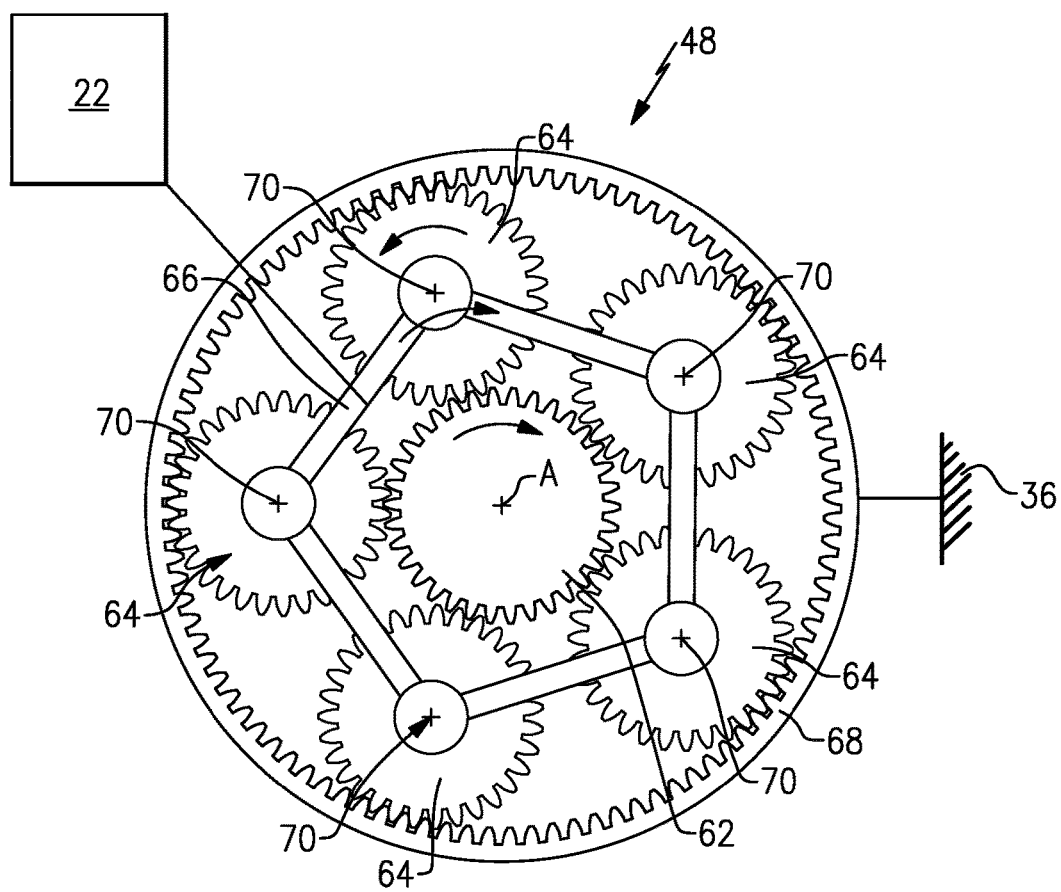
FIG. 2 is a schematic illustration of an example gear system embodiment.

Referring to FIG. 2, the example geared architecture or gear system 48 includes a sun gear 62 driven by the inner shaft 40 that drives planet gears 64 circumscribed by a ring gear 68. The planet gears 64 are supported within a carrier 66 that drives the fan section 22. The ring gear 68 is fixed to a static structure 36 of the engine 20. Each of the planet gears 64 rotate about an axis 70 and the carrier 66 rotates about the engine axis A.

Figure 3:
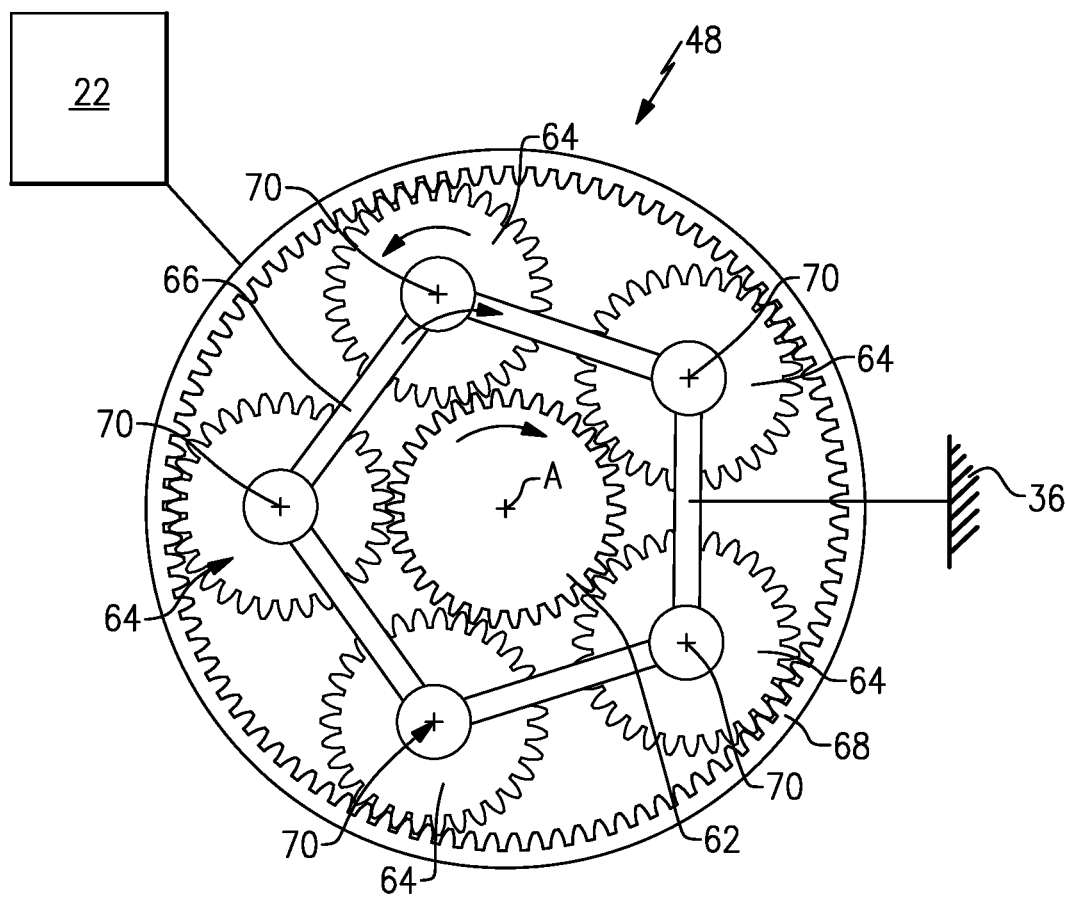
FIG. 3 is another schematic illustration of an example gear system embodiment.

Referring to FIG. 3, another example gear system 48 is illustrated where the carrier 66 is fixed to the engine static structure 36 and the ring gear 68 is rotatable to drive the fan section 22. In both configurations illustrated in FIGS. 2 and 3, the planet gears 64 are supported by journal bearing structures for rotation about corresponding axes 70.

Figure 4:
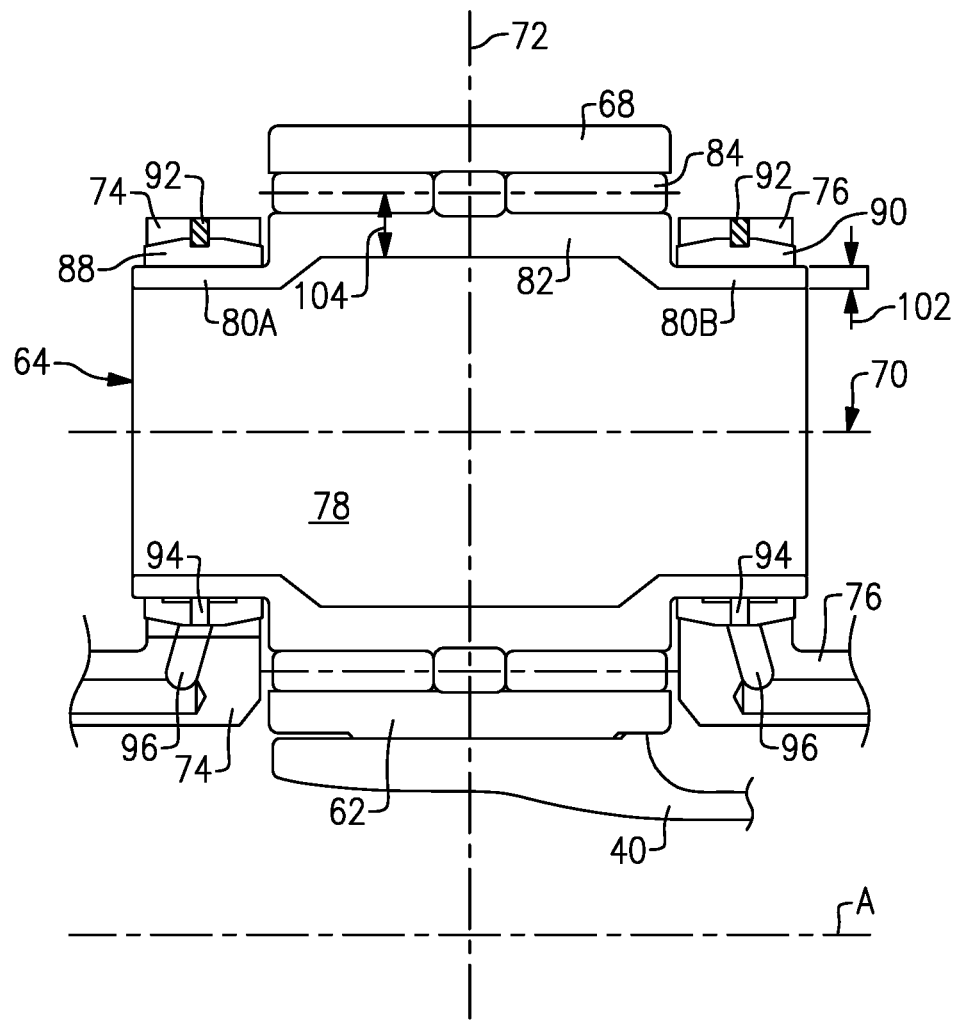
FIG. 4 is a cross-section of an example journal bearing embodiment supporting rotation of a planet gear.

Referring to FIG. 4, one of the plurality of planet gears 64 is shown mounted within the carrier 66. The example carrier 66 includes a forward wall 74 attached to an aft wall 76. The planet gear 64 is supported between the forward wall 74 and the aft wall 76 by a forward journal bearing 88 and an aft journal bearing 90. Accordingly, instead of a single bearing, the disclosed example bearing is provided as forward and aft journal bearings 88, 90.

The planet gear 64 includes end portions 80A-B and a central gear portion 82 that supports gear teeth. A forward facing end 80A is supported on an inner surface of the forward journal bearing 88. The aft facing end 80B is supported on the inner surface of the aft journal bearing 90.

Figure 5:
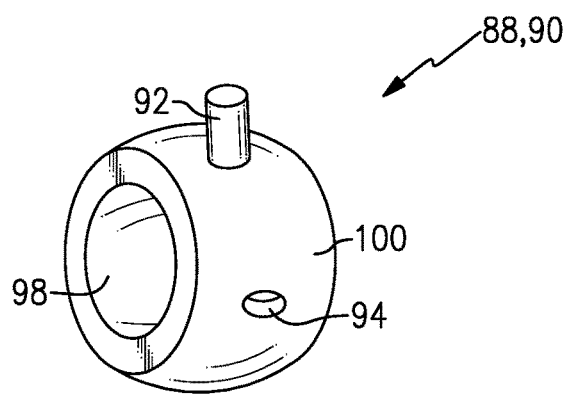
FIG. 5 is a perspective view of an example journal bearing embodiment.
Figure 6:
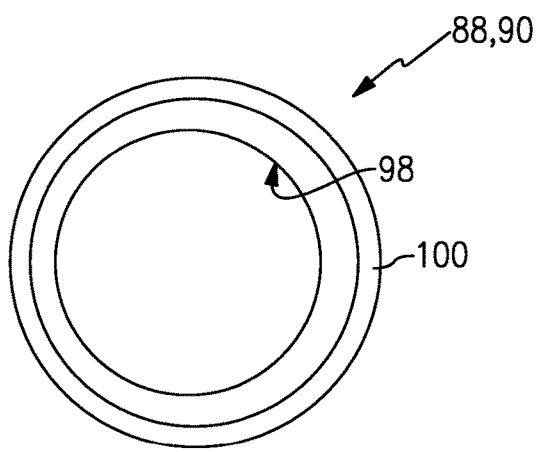
FIG. 6 is a side view of an example journal bearing embodiment.
Figure 7:
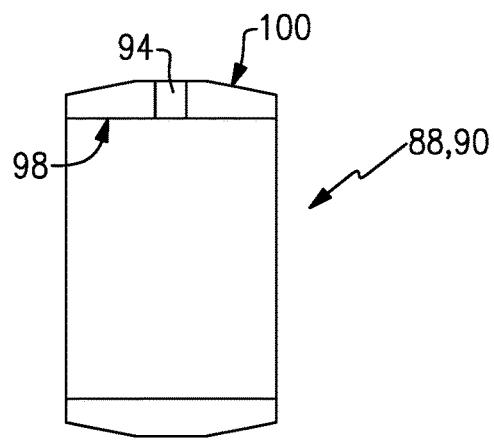
FIG. 7 is a cross-section on an example journal bearing.

Referring to FIGS. 5, 6 and 7 with continued reference to FIG. 4, the journal bearings 88, 90 are pinned to the corresponding forward and aft walls 74, 76 to constrain movement relative to the carrier 66. A pin 92 is fit within openings in the corresponding carrier wall 74, 76 and the journal bearing 88, 90. The pin 92 is a tight fit within either the carrier 66 or the journal bearing 88, 90 and loose fit within the other to enable flexing to accommodate misalignment. Accordingly, the pin 92 is tight fitted in one of either the journal bearing 88, 90 or the carrier 66 and the other of the journal bearing 88, 90 and the carrier 66 will have a loose fitting hole to allow the journal bearing 88, 90 to move or flex while still being held against rotation and maintaining the oil feed hole alignment.

Each journal bearing 88, 90 includes a spherically shaped outer surface 100. The spherical, rounded outer surface 100 enables the forward and aft journal bearings 88, 90 to accommodate misalignment that may occur during engine operation. An inner surface 98 is cylindrical to fit the ends 80A-B of the planet gear 64.

The journal bearings 88, 90 further include an opening 94 from the outer surface 100 to the inner surface 98 for communication of lubricant. The lubricant opening 94 corresponds with lubricant passages 96 defined within forward and aft walls 74, 76 of the carrier 66. The opening 94 enables communication of lubricant to the relative rotating interface between the planet gears 64 and the journal bearings 88, 90. Lubricant can be fed to the carrier 66 from an oil transfer bearing such as is disclosed in U.S. Pat. No. 8,813,469, incorporated in its entirety herein by reference.

The flexure and accommodation for movement provided by the dual journal bearings 88, 90 enable the planet gear 64 to be hollow with an inner cavity 78 and include ends 80A-B with a reduced thickness. The disclosed gear teeth 84 are no longer directly over the bearing surface, and therefore distortion is minimized and a heavy gear thickness is not needed. The spherical outer surfaces 100 accommodate gear rim bending and distortion.

In the disclosed example planet gear, a rim thickness 102 at each end 80A-B is less than two (2) times a height 104 of gear teeth 84. The resulting reduction in weight of the planet gear 64 reduces loads and is enabled by the separate forward and aft journal bearings 88, 90. The example journal bearings 88, 90 are fabricated from bronze, bronze coated material, a bronze alloy or a copper-lead alloy. Other known materials utilized for journal bearing construction are also within the contemplation of this disclosure.

Accordingly, the disclosed separate journal bearings enables thinner walls on the planet gear rim, reducing weight and loads on the bearing.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear system for a geared turbofan engine comprising:
   a sun gear;
   a carrier including a forward wall and an aft wall;
   a planet gear supported in the carrier and engaged to the sun gear, the planet gear including gear section disposed between a forward end and an aft end and an open inner cavity extending through the planet gear from the forward end to the aft end;
   a forward journal bearing disposed about an outer surface of the forward end of the planet gear and an aft journal bearing disposed about an outer surface of the aft end of the planet gear, wherein the forward journal bearing supports the forward end of the planet gear within the forward wall of the carrier and the aft journal bearing supports the aft end of the planet gear within the aft wall of the carrier, and wherein the aft journal bearing and the forward journal bearing each have a cylindrical inner surface fit to the corresponding forward end and aft end of the planet gear, an outer partially spherical surface and an oil feed opening; and
   a ring gear engaged to the planet gear.

2. The gear system as recited in claim 1, wherein one of the carrier and the ring gear is fixed.

3. The gear system as recited in claim 1, wherein the carrier is fixed and the ring gear rotates.

4. The gear system as recited in claim 1, wherein each of the aft journal bearing and the forward journal bearing includes an anti-rotation pin engaged to the corresponding one of the forward wall and aft wall of the carrier.

5. The gear system as recited in claim 4, wherein the carrier includes passages in communication with the oil feed opening for providing lubricant to each of the forward journal bearing and the aft journal bearing.

6. The gear system as recited in claim 4, wherein the oil feed opening and the anti-rotation pin are spaced at least 90 degrees apart.

7. The gear system as recited in claim 1, wherein the planet gear includes an internal cavity.

8. The gear system as recited in claim 1, wherein the forward end and the aft end each include a wall with a rim thickness that is less than two times a height of gear teeth in the gear section.

9. The gear system as recited in claim 1, wherein the forward journal bearing and the aft journal bearing include a portion of at least one of a bronze material, a bronze coating, a bronze alloy and a copper-lead alloy.

10. A geared turbofan engine comprising:
a fan configured to drive air along a bypass flow path;
a compressor section configured to communicate compressed air to a combustor section for generating a high energy gas flow for driving a turbine section where energy is extracted and utilized to drive the compressor section and the fan section; and
a gear system driven by the turbine section, the gear system including a sun gear, a planet gear supported in a carrier and engaged to the sun gear; a forward journal bearing and an aft journal bearing both supporting the planet gear, the carrier including a forward wall supporting the forward journal bearing and an aft wall supporting the aft journal bearing and a ring gear engaged to the planet gear, wherein the planet gear includes an open inner cavity extending through from a forward end to an aft end of the planet ear with the forward journal bearing disposed about an outer surface at the forward end and the aft journal bearing disposed about an outer surface at the aft end and each of the aft journal bearing and the forward journal bearing have an inner cylindrical surface fit to an outer surface of a corresponding forward end and aft end of the planet gear, an outer partially spherical surface and an oil feed opening.

11. The geared turbofan engine as recited in claim 10, wherein the carrier rotates and drives the fan and the ring gear is fixed.

12. The geared turbofan engine as recited in claim 10, wherein the carrier is fixed and the ring gear rotates to drive the fan.

13. The geared turbofan engine as recited in claim 10, wherein each of the aft journal bearing and the forward journal bearing includes an anti-rotation pin engaged to the corresponding one of the forward wall and aft wall of the carrier.

14. The geared turbofan engine as recited in claim 13, wherein the carrier includes passages in communication with the oil feed opening for providing lubricant to each of the forward journal bearing and the aft journal bearing.

15. The geared turbofan engine gear system as recited in claim 10, wherein the planet gear includes an internal cavity.

16. The geared turbofan engine as recited in claim 10, wherein the planet gear includes a gear section disposed between the forward end and the aft end, the gear section having gear teeth and each of the forward end and the aft end include a wall with a rim thickness less than two times a height of gear teeth in the gear section.

17. The geared turbofan engine as recited in claim 10, wherein the forward journal bearing and the aft journal bearing include at least a portion of at least one of a bronze material, a bronze coating, a bronze alloy and a copper-lead alloy.

18. The geared turbofan as recited in claim 13, wherein the oil feed opening and the anti-rotation pin are spaced at least 90 degrees apart.

* * * * *